(12) United States Patent
Vettical et al.

(10) Patent No.: US 10,191,870 B2
(45) Date of Patent: Jan. 29, 2019

(54) DATA POLLING USING A CHAIN SLEEP TECHNIQUE

(71) Applicants: Celestine S. Vettical, Houston, TX (US); Sony Lazarus, Kerala (IN); Ajayan Alphonse, Kerala (IN)

(72) Inventors: Celestine S. Vettical, Houston, TX (US); Sony Lazarus, Kerala (IN); Ajayan Alphonse, Kerala (IN)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 72 days.

(21) Appl. No.: 15/285,515

(22) Filed: Oct. 5, 2016

(65) Prior Publication Data
US 2018/0095912 A1 Apr. 5, 2018

(51) Int. Cl.
*G06F 13/22* (2006.01)
*E21B 47/12* (2012.01)
*E21B 47/00* (2012.01)

(52) U.S. Cl.
CPC .......... *G06F 13/22* (2013.01); *E21B 47/0007* (2013.01); *E21B 47/12* (2013.01)

(58) Field of Classification Search
CPC ...... E21B 47/0007; E21B 47/12; G06F 13/22; G06Q 10/06
USPC .......................................................... 710/46
See application file for complete search history.

(56) References Cited

U.S. PATENT DOCUMENTS

| 6,980,929 | B2 * | 12/2005 | Aronstam | G06Q 10/06 340/853.2 |
| 7,389,787 | B2 * | 6/2008 | Means | E21B 37/06 137/13 |
| 7,467,192 | B1 * | 12/2008 | Lemler | H04L 41/5006 709/220 |
| 7,502,358 | B1 * | 3/2009 | Kopikare | H04W 74/06 370/346 |
| 7,672,262 | B2 * | 3/2010 | McCoy | E21B 47/0007 370/310 |

(Continued)

OTHER PUBLICATIONS

H. Yang, et al. "Queueing Analysis of Polling Based Wireless MACProtocols with Sleep-Wake Cycles", Department of ECSE, Rensselaer Polytechnic Institute, submitted Nov. 19, 2009 p. 1-7.

(Continued)

*Primary Examiner* — Brian T Misiura
(74) *Attorney, Agent, or Firm* — Cantor Colburn LLP

(57) ABSTRACT

Examples of data polling using a chain sleep technique are disclosed. In one example, a computer-implemented method includes: computing a least common multiplier (LCM) based on a polling time for each of a plurality of devices deployed in a well operation to be polled; generating a sequence of polling elements, wherein each of the polling elements represents a multiple of the polling time for each of the plurality of devices, wherein the sequence of polling elements begins with the lowest polling time and ends with the LCM; sorting the sequence of polling elements from lowest value to highest value as an ordered list; calculating a distance between each of the polling elements of the ordered list; generating a polling chain based on the ordered list and the distance between each of the polling elements; and polling the plurality of devices in the well operation based on the polling chain.

16 Claims, 6 Drawing Sheets

(56) References Cited

U.S. PATENT DOCUMENTS

| | | | |
|---|---|---|---|
| 7,693,085 B2* | 4/2010 | Benveniste | H04L 12/5602 370/252 |
| 9,683,438 B2* | 6/2017 | Fanini | E21B 47/12 |
| 9,714,568 B2* | 7/2017 | Rendusara | E21B 47/122 |
| 2003/0154056 A1 | 8/2003 | Ito et al. | |
| 2004/0133913 A1 | 7/2004 | Benveniste | |
| 2007/0209434 A1 | 9/2007 | Peters | |
| 2008/0240105 A1 | 10/2008 | Abdallah | |
| 2016/0086203 A1 | 3/2016 | Dove et al. | |

OTHER PUBLICATIONS

Notification of Transmittal of the International Search Report and the Written Opinion of the International Searching Authority, or the Declaration; PCT/US2017/055106; dated Jan. 16, 2018; 13 pages.

\* cited by examiner

DATA POLLING USING A CHAIN SLEEP TECHNIQUE

BACKGROUND

The present disclosure relates generally to well operations and, more particularly, to data polling using a chain sleep technique.

Device polling is useful for collecting data from and controlling devices used in a well operation (or across multiple well operations). For example, it may be desirable to collect data from various devices such as artificial lift systems, submersible pumps, and the like. The data may be collected periodically, such as every few seconds, minutes, or hours, depending on the type of device and/or the type of data collected. In some implementations, virtual servers and/or cloud services may be used in collecting and storing the data.

BRIEF SUMMARY

According to examples of the present disclosure, techniques including methods, systems, and/or computer program products for a data polling using a chain sleep are provided. An example computer-implemented method may include: computing, by a processing device, a least common multiplier (LCM) based on a polling time for each of a plurality of devices deployed in a well operation to be polled; generating, by the processing device, a sequence of polling elements, wherein each of the polling elements represents a multiple of the polling time for each of the plurality of devices, wherein the sequence of polling elements begins with the lowest polling time and ends with the LCM; sorting, by the processing device, the sequence of polling elements from lowest value to highest value as an ordered list; calculating, by the processing device, a distance between each of the polling elements of the ordered list; generating, by the processing device, a polling chain based on the ordered list and the distance between each of the polling elements; and polling, by the processing device, the plurality of devices in the well operation based on the polling chain.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Data polling may be used to collect data from various devices in a well operation. Each of these devices may provide one or more types of data. Existing data polling techniques are limited in the number of devices that can be polled. The present disclosure addresses the challenge of the technical limitation on the number of simultaneous physical devices that can be reliably accessed and controlled per server and the resulting high cost. In particular, the present disclosure provides a data polling device with a dynamic scheduling mechanism using an efficient algorithm and data structure to handle more devices simultaneous than existing techniques.

The chain sleep technique disclosed herein makes use of a least common multiplier to form a chain of active trigger nodes that trigger a polling request and are linked with inactive sleep nodes that contain the next poll distance (i.e., a sleep duration). This gives preferences for other active instances to effectively poll the devices. The chain sleep technique handles the polling triggers without the use of any database and/or file system by using a chain-like data structure that is made of the active trigger nodes and inactive sleep nodes. Active trigger nodes utilize processing time of a processing device for processing a task. Sleep nodes connected between two consecutive active trigger nodes and provide processing priority to other active instances. According to aspects of the present disclosure, the chain sleep technique is capable of handling dynamic polling at multiple intervals in an effective and efficient manner to poll data from multiple devices, such as devices used at a well operation.

Example embodiments of the disclosure include or yield various technical features, technical effects, and/or improvements to technology. Example embodiments of the disclosure provide for data polling using a chain sleep technique. The chain sleep technique described herein provides for the efficient collection of data from devices used in a well operation. These aspects of the disclosure constitute technical features that yield the technical effect of enabling many nodes to be polled by a single processing system. As a result of these technical features and technical effects, the present chain sleep technique may provide a ten-fold increase in the number of devices that may be polled in comparison to existing techniques. Moreover, the data collected using the chain sleep technique described herein can be used to control the devices from which the data is collected. For example, it may be determined that a device such as a submersible pump should increase pressure based on collected data to increase production levels. It should be appreciated that the above examples of technical features, technical effects, and improvements to technology of example embodiments of the disclosure are merely illustrative and not exhaustive.

Figure 1:
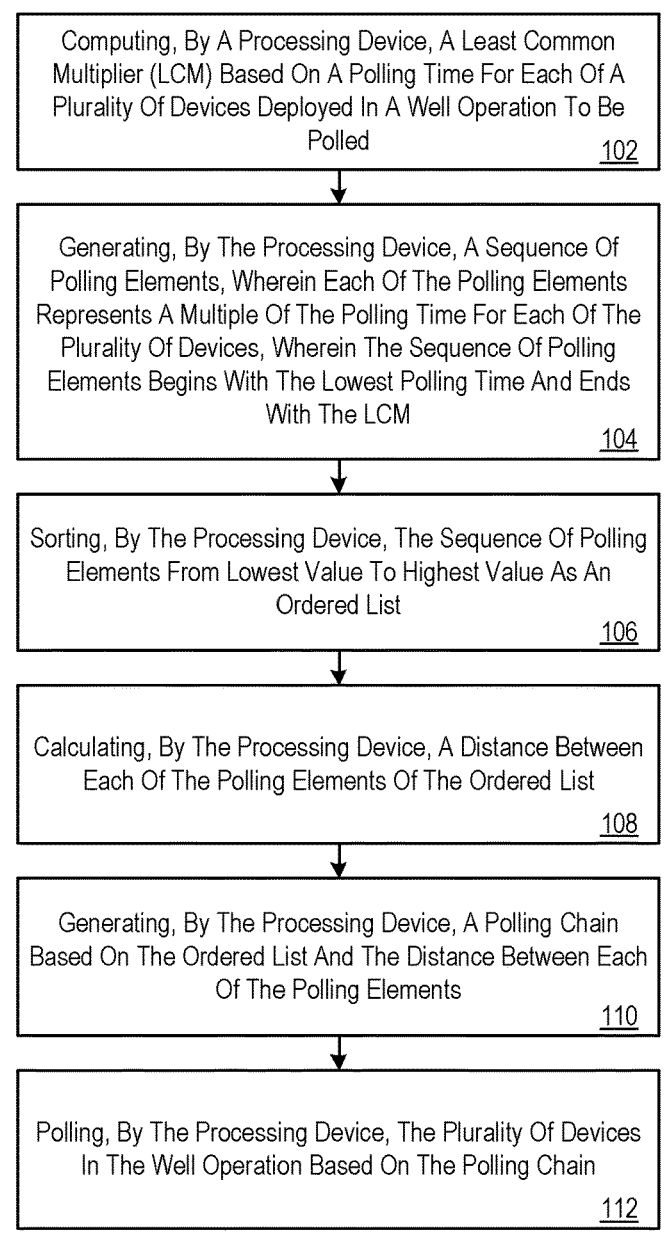
FIG. 1 illustrates a block diagram of a processing system generating a script for performing a well operation job according to aspects of the present disclosure.

FIG. 1 illustrates a flow diagram of a method 100 for data polling using a chain sleep technique according to aspects of the present disclosure. The method 100 may be performed by any suitable processing system, such as the processing system 20 of FIG. 3, or by another suitable processing system.

Devices used in a well operation, such as artificial lift systems, submersible pumps, and other equipment, may be polled to collect data about the devices. By polling the devices to collect data, the well operation can be monitored and the devices can be controlled. For example, if data indicates that a pump is not pumping at a high enough rate, the rate may be increased, such as by an automated system or technician.

The polling time for each device (or for each of a plurality of sensors within the device) represents a time that each device is to be polled. For example, a device (or sensor) may be polled every three seconds, every five seconds, every two minutes, every fifteen minutes, every hour, every three hours, etc. It should be appreciated that other polling times are possible and within the scope of the present disclosure.

At block 102, the method 100 includes computing, by a processing device, a least common multiplier based on a polling time for each of a plurality of devices deployed in a well operation to be polled. The LCM of any combination of numbers (e.g., polling times) is perfectly divisible by all of the members which is used to compute the LCM. For example, the LCM of the numbers 3 and 4 is 12, which is perfectly divisible by both 3 and 4. Similarly, the LCM of the numbers 3, 6, and 9 is 18, which is perfectly divisible by 3, 6, and 9.

At block 104, the method 100 includes generating, by the processing device, a sequence of polling elements. Each of the polling elements represents a multiple of the polling time for each of the plurality of devices. The sequence of polling elements begins with the lowest polling time and ends with the LCM. Using the example with polling times of 3 and 4 with an LCM of 12, the polling elements for 3 is 3, 6, 9, and 12 and the polling elements for 4 is 4, 8, and 12.

Figure 2A:
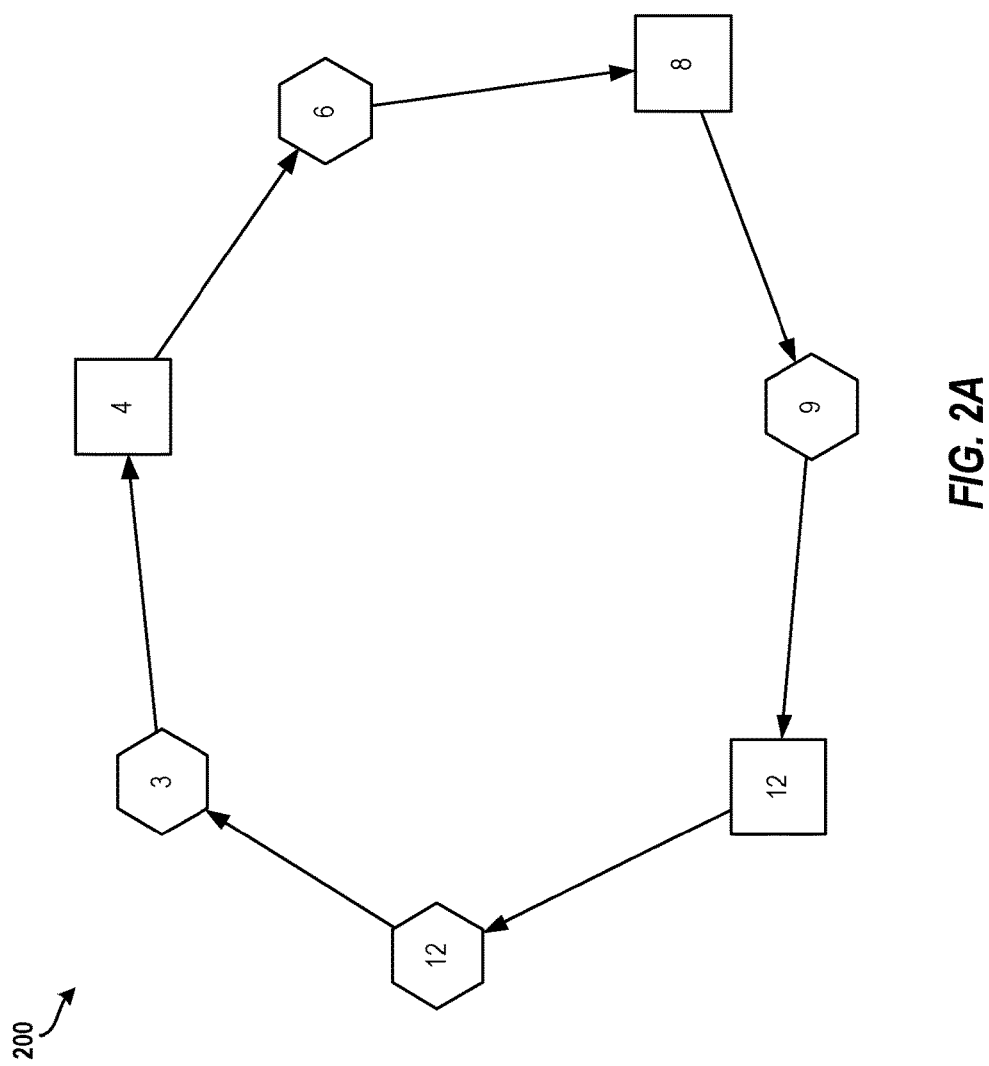
FIGS. 2A, 2B, 2C, and 2D illustrate examples of polling chain data structures according to aspects of the present disclosure.

At block 106, the method 100 includes sorting, by the processing device, the sequence of polling elements from lowest value to highest value as an ordered list. Using the polling times of 3 (for device 1) and 4 (for device 2) with polling elements 3, 6, 9, 12 and 4, 8, 12 respectively, the sorted sequence is 3, 4, 6, 8, 9, 12, 12. It should be appreciated that the value 12 is repeated as it is an element in the set of polling times for both 3 and 4. FIG. 2A illustrates a block diagram of a polling chain data structure 200 of the sorted sequences of polling elements for devices 1 and 2 according to aspects of the present disclosure. The hexagon elements represent device 1's polling elements and the square elements represent device 2's polling elements.

Continuing with reference to FIG. 1, at block 108, the method 100 includes calculating, by the processing device, a distance between each of the polling elements of the ordered list. For example, using the sorted sequence 3, 4, 6, 8, 9, 12, 12, the distance between 3 and 4 is 1, the distance between 4 and 6 is 2, the distance between 6 and 8 is 2, the distance between 8 and 9 is one, the distance between 9 and 12 is 3, and the distance between 12 and 12 is 0. It should also be appreciated that the distance between the highest value (12) and the lowest value (3) is calculated as 3, because once the last polling occurs at 12, the polling restarts and the lowest value is 3. It should be appreciated that the distance represents an amount of delay (or sleep) time between polling elements.

Figure 2B:
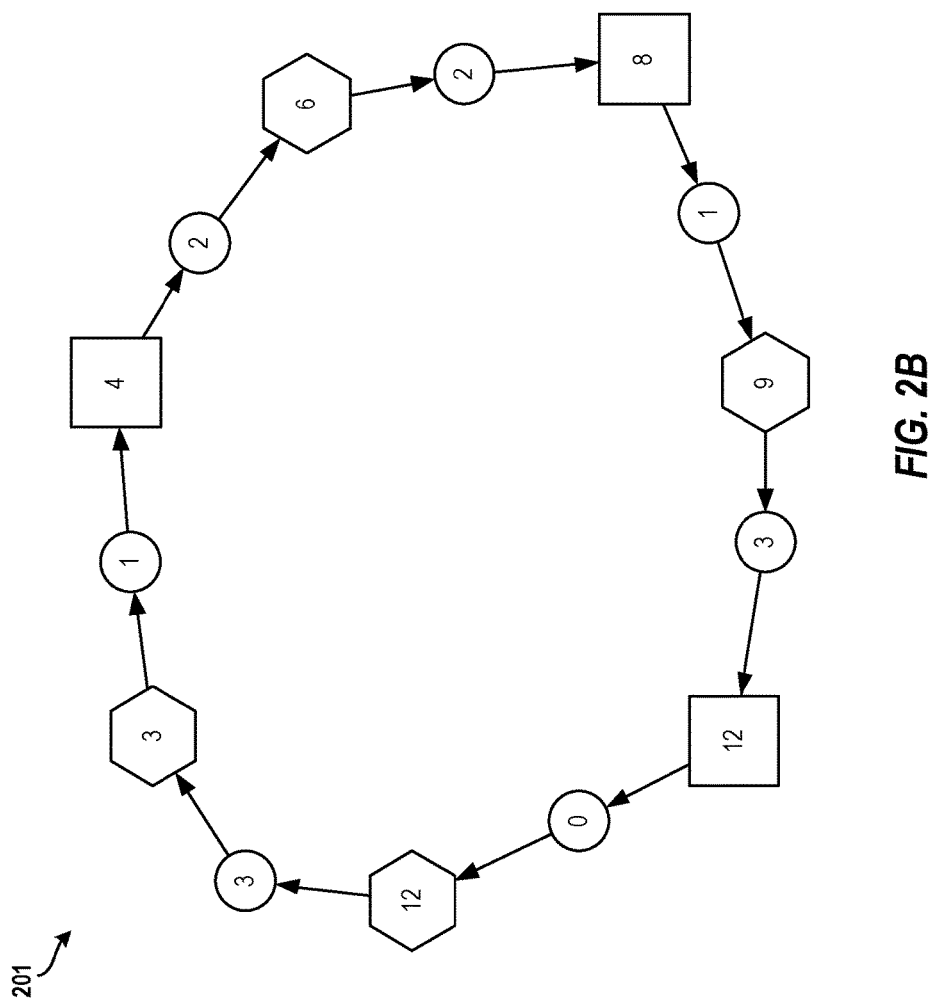

FIG. 2B illustrates a block diagram of a polling chain data structure 201 of the sorted sequences of polling elements for devices 1 and 2 including the calculated distances between each polling element according to aspects of the present disclosure.

Continuing with reference to FIG. 1, at block 110, the method 100 includes generating, by the processing device, a polling chain based on the ordered list and the distance between each of the polling elements. The polling chain includes the polling elements, in order from lowest to highest, and the respective distances between each of the polling elements, with the last (highest) polling element linking back to the first (lowest) polling element. FIG. 2B illustrates a block diagram of a polling chain data structure 201 of the sorted sequences of polling elements for devices 1 and 2 including the calculated distances between each polling element according to aspects of the present disclosure.

Figure 2C:
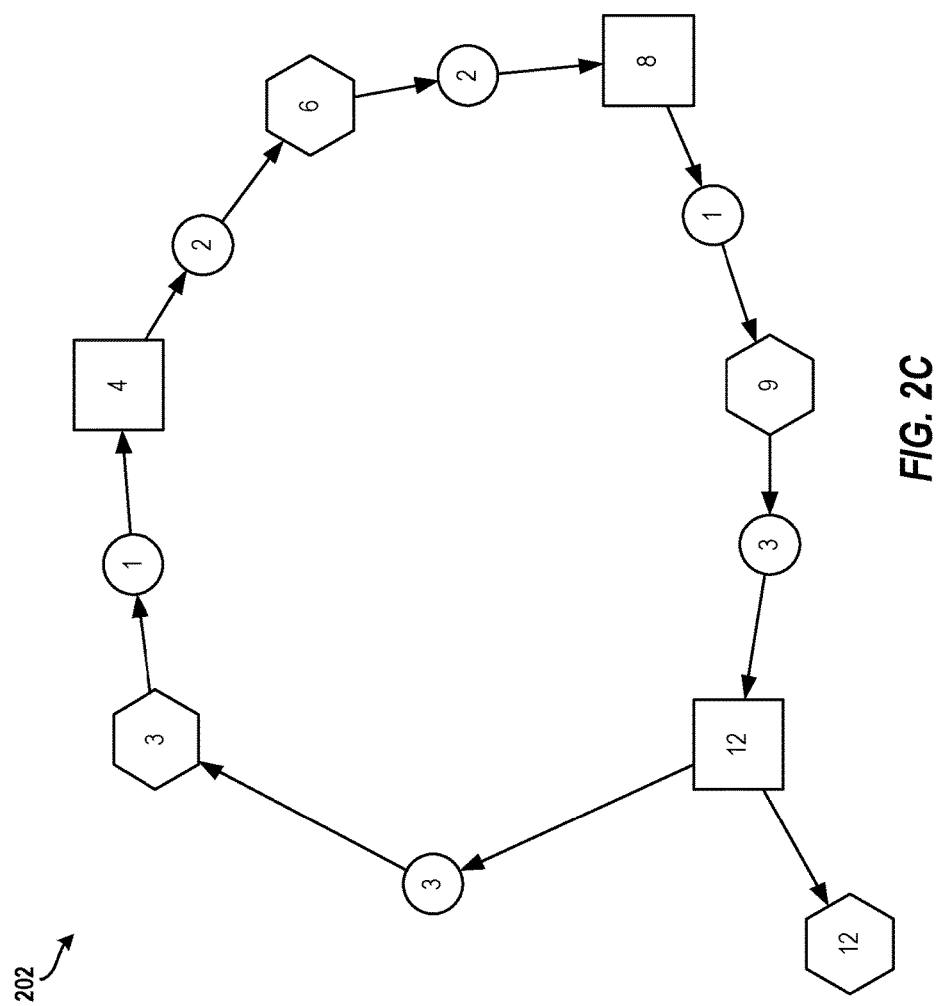
Figure 2D:
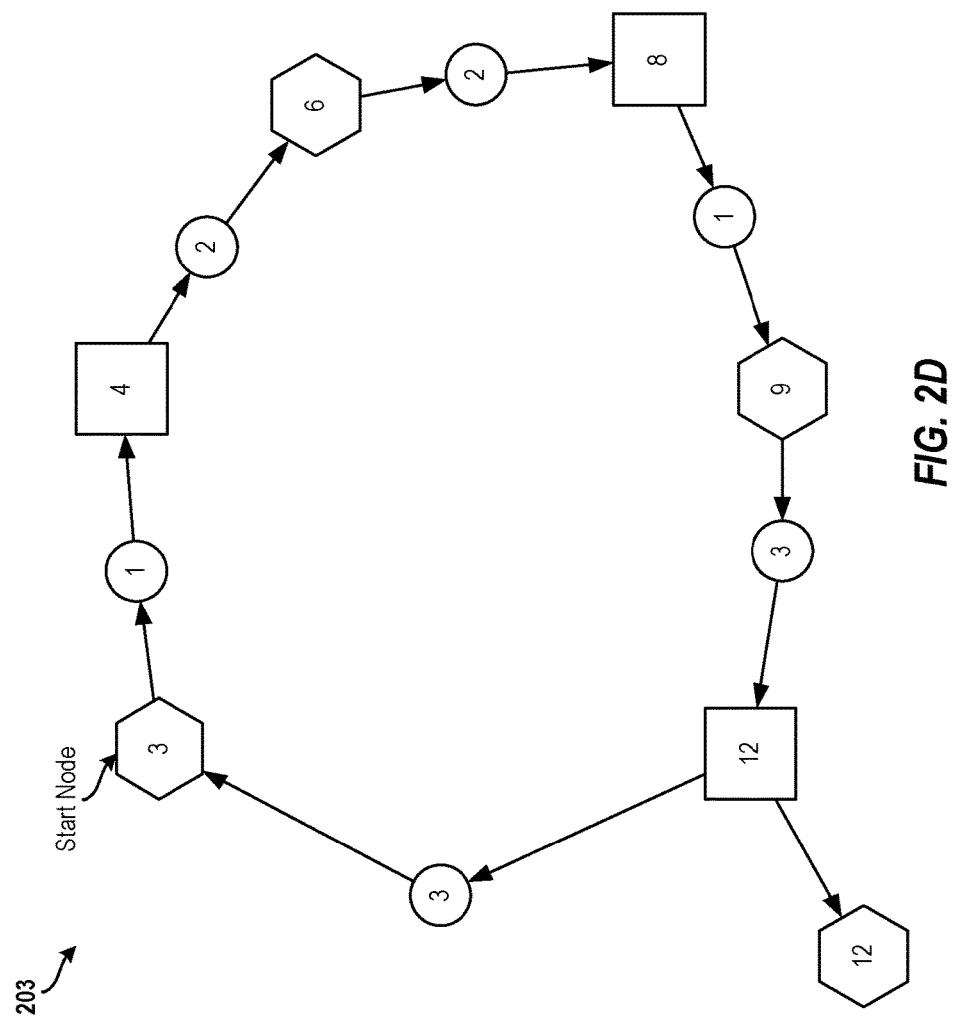

FIG. 2C illustrates a block diagram of a polling chain data structure 202 including the ordered list and the distance between each of the polling elements according to aspects of the present disclosure. In the example of FIG. 2C, adjacent polling elements are filtered to combine polling elements with zero distances there between. Adjacent polling elements are indicated by a zero distance between polling elements. These adjacent polling elements are polled concurrently. FIG. 2D illustrates a block diagram of a polling chain data structure 203 that includes a designated start node. The polling chain includes each of the polling elements, and each of the polling elements is separated by a sleep element. It should be appreciated that the sleep element is the measured distance between two adjacent nodes and represents an amount of time (e.g., 3 seconds, 1 hour, etc.).

Continuing with reference to FIG. 1, at block 112, the method 100 includes polling, by the processing device, the plurality of devices in the well operation based on the polling chain. That is, the method 100 includes polling each of the plurality of devices at the times indicated by the polling elements for each of the devices and waiting the distance delay between each of the polling elements where no polling occurs. No polling occurs at times corresponding to the sleep elements while polling does occur at times corresponding to the polling elements.

Additional processes also may be included. For example, the method 100 may include generating a report. The report may include simulated values for the operating parameters, such as (operating time, maximum borehole temperature, maximum hydrostatic pressure, maximum tension on the cable, amount of additional pull available when trying to free a stuck tool, minimum tension on the cable, maximum downhole tools temperature, maximum mechanical stress on the downhole tool housings, maximum production rate acceptable, pressure swab and surge effects and any other outcome resulting from the execution of the operation planned). The report may also include statements corresponding to the values that describe how well each value of the operating parameters complies with a set of pre-defined target ranges for each of the operating parameters. It should be understood that the processes depicted in FIG. 1 represent illustrations, and that other processes may be added or existing processes may be removed, modified, or rearranged without departing from the scope and spirit of the present disclosure.

Figure 3:
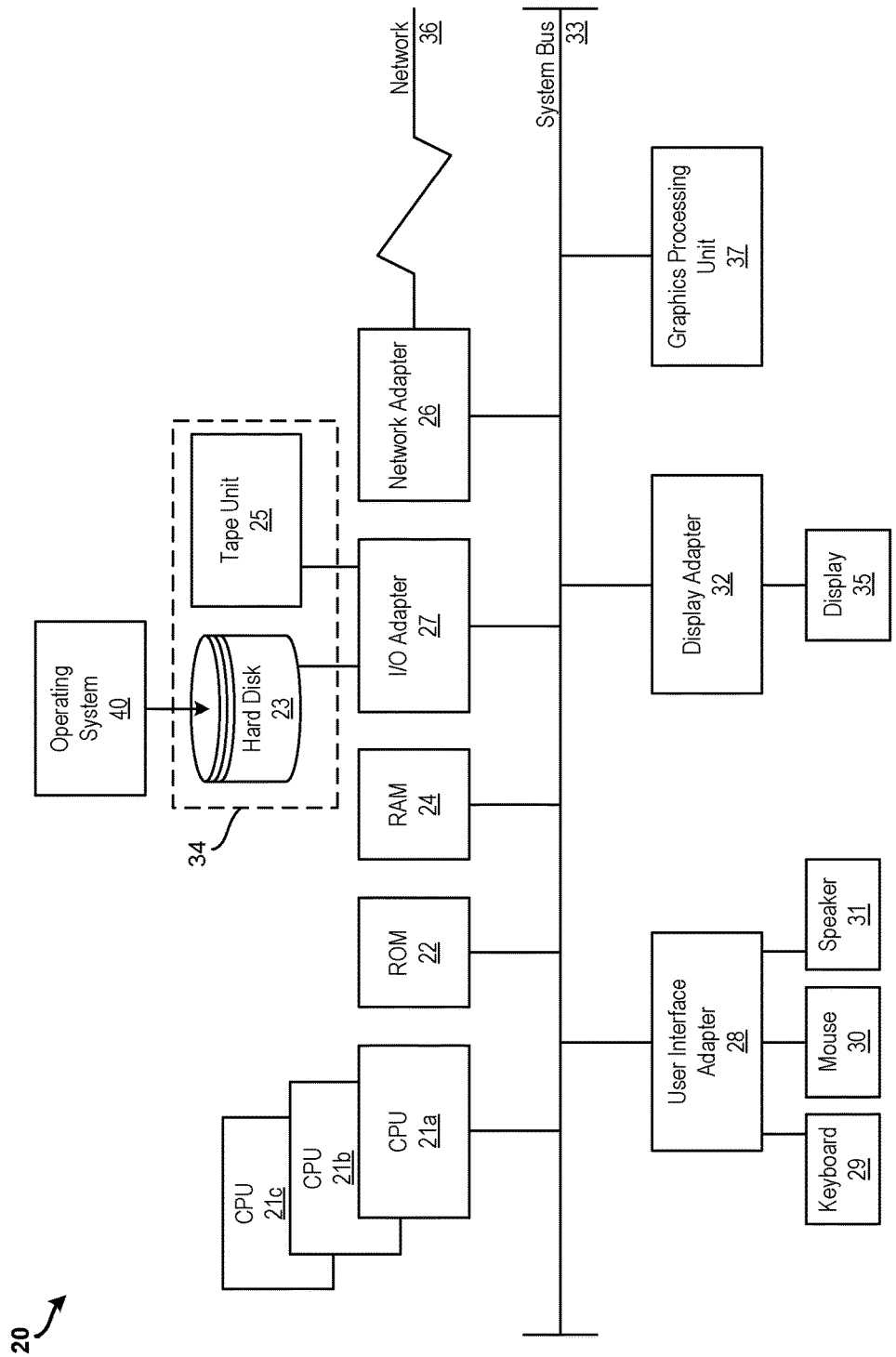
FIG. 3 illustrates a block diagram of a processing system for implementing the techniques described herein according to aspects of the present disclosure.

It is understood in advance that the present disclosure is capable of being implemented in conjunction with any other type of computing environment now known or later developed. For example, FIG. 3 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

Set forth below are some embodiments of the foregoing disclosure:

Embodiment 1

A computer-implemented method for data polling using a chain sleep technique, the method comprising: computing, by a processing device, a least common multiplier (LCM) based on a polling time for each of a plurality of devices deployed in a well operation to be polled; generating, by the processing device, a sequence of polling elements, wherein each of the polling elements represents a multiple of the polling time for each of the plurality of devices, wherein the sequence of polling elements begins with the lowest polling time and ends with the LCM; sorting, by the processing device, the sequence of polling elements from lowest value to highest value as an ordered list; calculating, by the processing device, a distance between each of the polling elements of the ordered list; generating, by the processing device, a polling chain based on the ordered list and the distance between each of the polling elements; and polling, by the processing device, the plurality of devices in the well operation based on the polling chain.

Embodiment 2

The method of any prior embodiment, wherein the polling chain comprises each of the polling elements, and wherein each of the polling elements is separated by a sleep element.

Embodiment 3

The method of any prior embodiment, wherein the sleep element represents the distance between each of the polling elements, and wherein the distance is a length of time.

Embodiment 4

The method of any prior embodiment, further comprising filtering the polling chain to remove duplicate polling elements.

Embodiment 5

The method of any prior embodiment, wherein the polling element indicates which of the plurality of devices is to be polled.

Embodiment 6

The method of any prior embodiment, wherein the polling occurs at times corresponding to the polling elements.

Embodiment 7

The method of any prior embodiment, wherein no polling occurs at times corresponding to the sleep elements.

Embodiment 8

The method of any prior embodiment, wherein the polling chain further comprises a designated start device.

Embodiment 9

The method of any prior embodiment, wherein the start device is the lowest value polling element.

Embodiment 10

The method of any prior embodiment, wherein the polling begins at the designated start device and continues to the highest value polling element.

Embodiment 11

The method of any prior embodiment, wherein the polling returns to the start device after polling the highest value polling element and repeats the polling.

Embodiment 12

The method of any prior embodiment, further comprising controlling at least one of the devices used in the well operation based on data collected during the polling.

Embodiment 13

A system for deployment risk management, the system comprising: a memory having computer readable instructions; and a processing device for executing the computer readable instructions, the computer readable instructions comprising: polling a plurality of devices using a polling chain generated based on a least common multiplier of a polling time for each of a plurality of devices deployed in a well operation; and controlling at least one of the plurality of devices used in the well operation based on data collected during the polling.

Embodiment 14

The system of any prior embodiment, wherein the polling chain comprises polling elements, and wherein each of the polling elements is separated by a sleep element.

Embodiment 15

The system of any prior embodiment, wherein the sleep element represents the distance between each of the polling elements, and wherein the distance is a length of time.

Embodiment 16

The system of any prior embodiment, wherein the polling element indicates which of the plurality of devices is to be polled, wherein the polling occurs at times corresponding to the polling elements, wherein no polling occurs at times corresponding to the sleep elements.

While one or more embodiments have been shown and described, modifications and substitutions may be made thereto without departing from the spirit and scope of the invention. Accordingly, it is to be understood that the present invention has been described by way of illustrations and not limitation.

What is claimed is:

1. A computer-implemented method for data polling using a chain sleep technique, the method comprising:
   computing, by a processing device, a least common multiplier (LCM) based on a polling time for each of a plurality of devices deployed in a well operation to be polled;
   generating, by the processing device, a sequence of polling elements, wherein each of the polling elements represents a multiple of the polling time for each of the plurality of devices, wherein the sequence of polling elements begins with the lowest polling time and ends with the LCM;
   sorting, by the processing device, the sequence of polling elements from lowest value to highest value as an ordered list;
   calculating, by the processing device, a distance between each of the polling elements of the ordered list;
   generating, by the processing device, a polling chain based on the ordered list and the distance between each of the polling elements; and
   polling, by the processing device, the plurality of devices in the well operation based on the polling chain.

2. The method of claim 1, wherein the polling chain comprises each of the polling elements, and wherein each of the polling elements is separated by a sleep element.

3. The method of claim 2, wherein the sleep element represents the distance between each of the polling elements, and wherein the distance is a length of time.

4. The method of claim 1, further comprising filtering the polling chain to remove duplicate polling elements.

5. The method of claim 1, wherein the polling element indicates which of the plurality of devices is to be polled.

6. The method of claim 1, wherein the polling occurs at times corresponding to the polling elements.

7. The method of claim 2, wherein no polling occurs at times corresponding to the sleep elements.

8. The method of claim 1, wherein the polling chain further comprises a designated start device.

9. The method of claim 8, wherein the start device is the lowest value polling element.

10. The method of claim 9, wherein the polling begins at the designated start device and continues to the highest value polling element.

11. The method of claim 10, wherein the polling returns to the start device after polling the highest value polling element and repeats the polling.

12. The method of claim 10, further comprising controlling at least one of the devices used in the well operation based on data collected during the polling.

13. The method of claim 1, wherein the distance represents an amount of delay time between polling elements.

14. A system for deployment risk management, the system comprising:
   a non-transitory computer readable storage medium having computer readable instructions stored thereon, the computer readable instructions comprising:
      polling a plurality of devices using a polling chain generated based on a least common multiplier of a polling time for each of a plurality of devices deployed in a well operation, wherein the polling chain comprises polling elements, each of the polling elements being separated by a sleep element, wherein the polling chain is generated based at least in part on an ordered list and a calculated distance between each of the polling elements of the ordered list, the ordered list comprising a sequence of the polling elements from a lowest value to a highest value; and
      controlling at least one of the plurality of devices used in the well operation based on data collected during the polling.

15. The system of claim 14, wherein the sleep element represents the distance between each of the polling elements, and wherein the distance is a length of time.

16. The system of claim 14, wherein the polling element indicates which of the plurality of devices is to be polled, wherein the polling occurs at times corresponding to the polling elements, wherein no polling occurs at times corresponding to the sleep elements.

* * * * *